United States Patent
Williams et al.

(10) Patent No.: US 6,830,423 B1
(45) Date of Patent: Dec. 14, 2004

(54) PERSONAL MOBILITY VEHICLE LIFT

(75) Inventors: Chad Williams, Sarasota, FL (US); Jeff DuVal, Sarasota, FL (US)

(73) Assignee: Chadco Enterprises, Inc., Sarasota, FL (US)

( * ) Notice: Subject to any disclaimer, the term of this patent is extended or adjusted under 35 U.S.C. 154(b) by 110 days.

(21) Appl. No.: 10/323,170

(22) Filed: Dec. 18, 2002

(51) Int. Cl.⁷ .................................................. B60P 9/00
(52) U.S. Cl. ........................................ 414/462; 212/180
(58) Field of Search ................................ 414/462, 539, 414/540, 541, 542, 543; 212/180, 224, 293

(56) References Cited

U.S. PATENT DOCUMENTS

| | | | |
|---|---|---|---|
| 4,127,200 A | | 11/1978 | Mann |
| 4,671,729 A | | 6/1987 | McFarland |
| 4,697,975 A | | 10/1987 | Lippold |
| 4,705,448 A | | 11/1987 | Mungons |
| 4,738,581 A | | 4/1988 | Kuhlman |
| 4,741,660 A | | 5/1988 | Kent |
| 4,881,864 A | * | 11/1989 | Amato ........................ 414/543 |
| 5,011,361 A | | 4/1991 | Peterson |
| 5,114,120 A | | 5/1992 | Bartelt |
| 5,205,700 A | | 4/1993 | Lin |
| 5,431,522 A | | 7/1995 | Ross |
| 5,431,526 A | | 7/1995 | Peterson et al. |
| 5,540,537 A | * | 7/1996 | Welch ........................ 414/462 |
| 5,752,799 A | | 5/1998 | Carey |
| 5,791,858 A | * | 8/1998 | Sasser ........................ 414/462 |
| 5,810,547 A | | 9/1998 | Bruno |
| 5,816,763 A | | 10/1998 | Hamann |
| 5,853,282 A | | 12/1998 | Bechler |
| 6,007,289 A | | 12/1999 | Kruse |
| 6,036,417 A | * | 3/2000 | Weaver ........................ 410/7 |
| 6,042,328 A | * | 3/2000 | McVaugh ................... 414/546 |
| 6,089,431 A | * | 7/2000 | Heyworth ................... 224/521 |
| 6,095,349 A | * | 8/2000 | O'Meara ..................... 212/180 |
| 6,138,991 A | * | 10/2000 | Myers, Jr. ................... 254/323 |
| 6,152,675 A | * | 11/2000 | Compton .................... 414/543 |
| 6,202,868 B1 | * | 3/2001 | Murray ....................... 212/294 |
| 6,203,044 B1 | * | 3/2001 | Conaway et al. ......... 280/304.1 |
| 6,250,483 B1 | * | 6/2001 | Frommer .................... 212/180 |
| 6,386,410 B1 | | 5/2002 | Van Dusen |
| 6,386,820 B1 | * | 5/2002 | Cunningham ............... 414/550 |
| 6,478,528 B1 | * | 11/2002 | Asbury ....................... 414/550 |
| 6,499,610 B2 | * | 12/2002 | Spitsbergen ................ 212/179 |
| 6,547,507 B1 | * | 4/2003 | Gest et al. .................. 414/543 |
| 6,578,722 B2 | * | 6/2003 | Perkins et al. ............. 212/180 |
| 6,599,078 B1 | * | 7/2003 | Elder ......................... 414/542 |

* cited by examiner

*Primary Examiner*—Douglas Hess
(74) *Attorney, Agent, or Firm*—Charles J. Prescott

(57) ABSTRACT

A personal mobility vehicle (PMV) lift for loading and offloading a personal mobility vehicle (PMV) into and from a rear portion of a vehicle, the vehicle having an interior floor and a trailer hitch rigidly attached to the rear of the vehicle to which the PMV lift is rigidly engageable. The PMV lift receives substantially all of its support from the trailer hitch and includes an elongated laterally extending lifting boom and a drive mechanism connected adjacent a proximal end thereof. The drive mechanism includes an elongated flexible lifting cable or belt which is operably connectable for raising and lowering the PMV by operation of the drive mechanism. An upright stanchion is supportively connected to the lifting boom while an elongated lift support arm is supportively connected to a lower end of the stanchion. A trailer hitch engaging member is connectable at one end to the trailer hitch, the other end of which is connected to a proximal end of the lift support arm. The PMV lift is substantially fully supported by the trailer hitch.

12 Claims, 4 Drawing Sheets

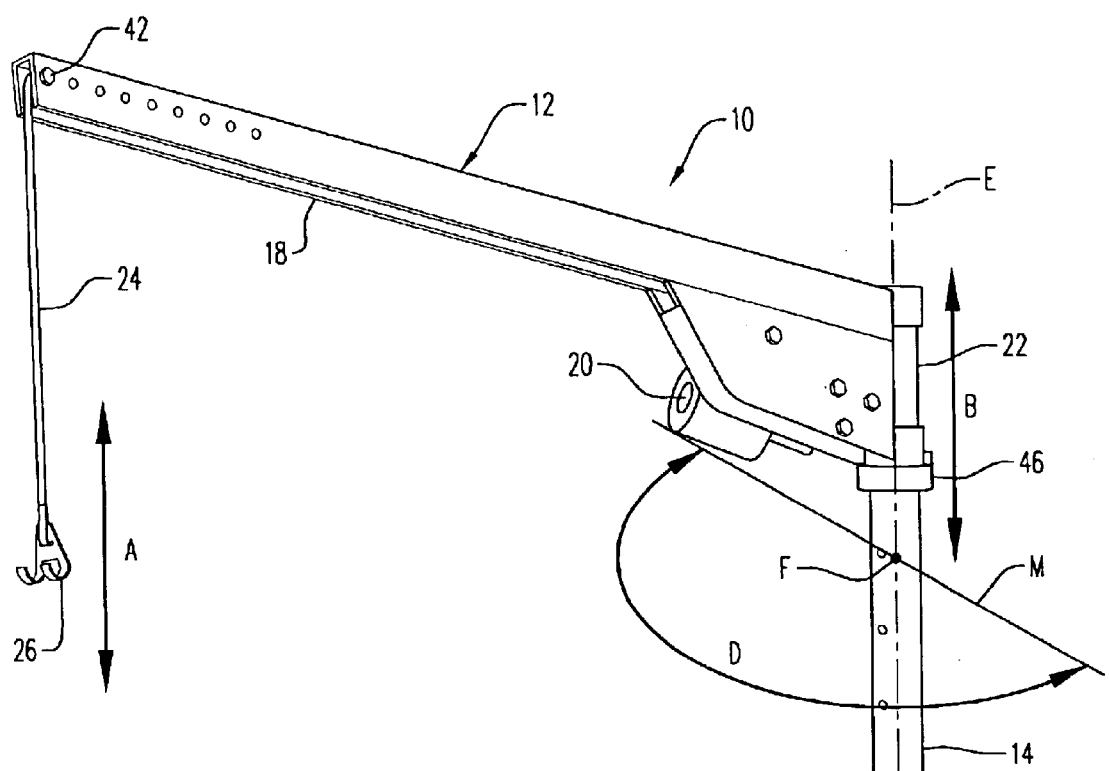
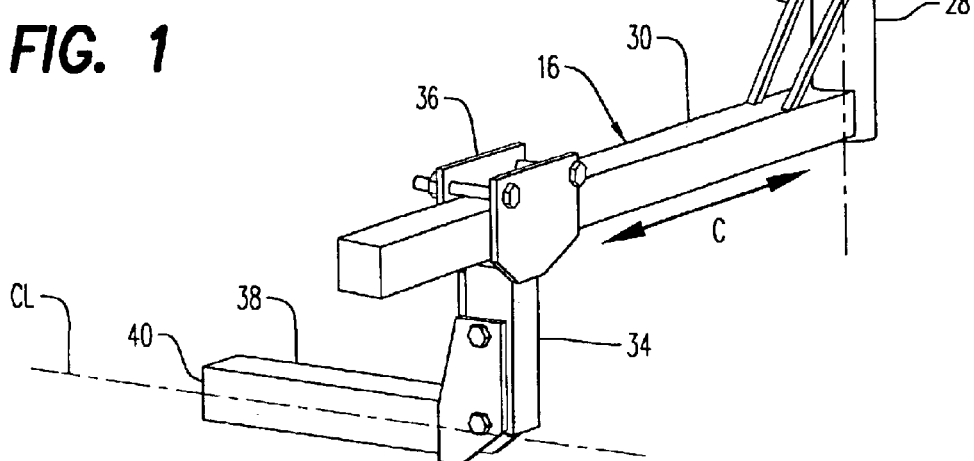
FIG. 1

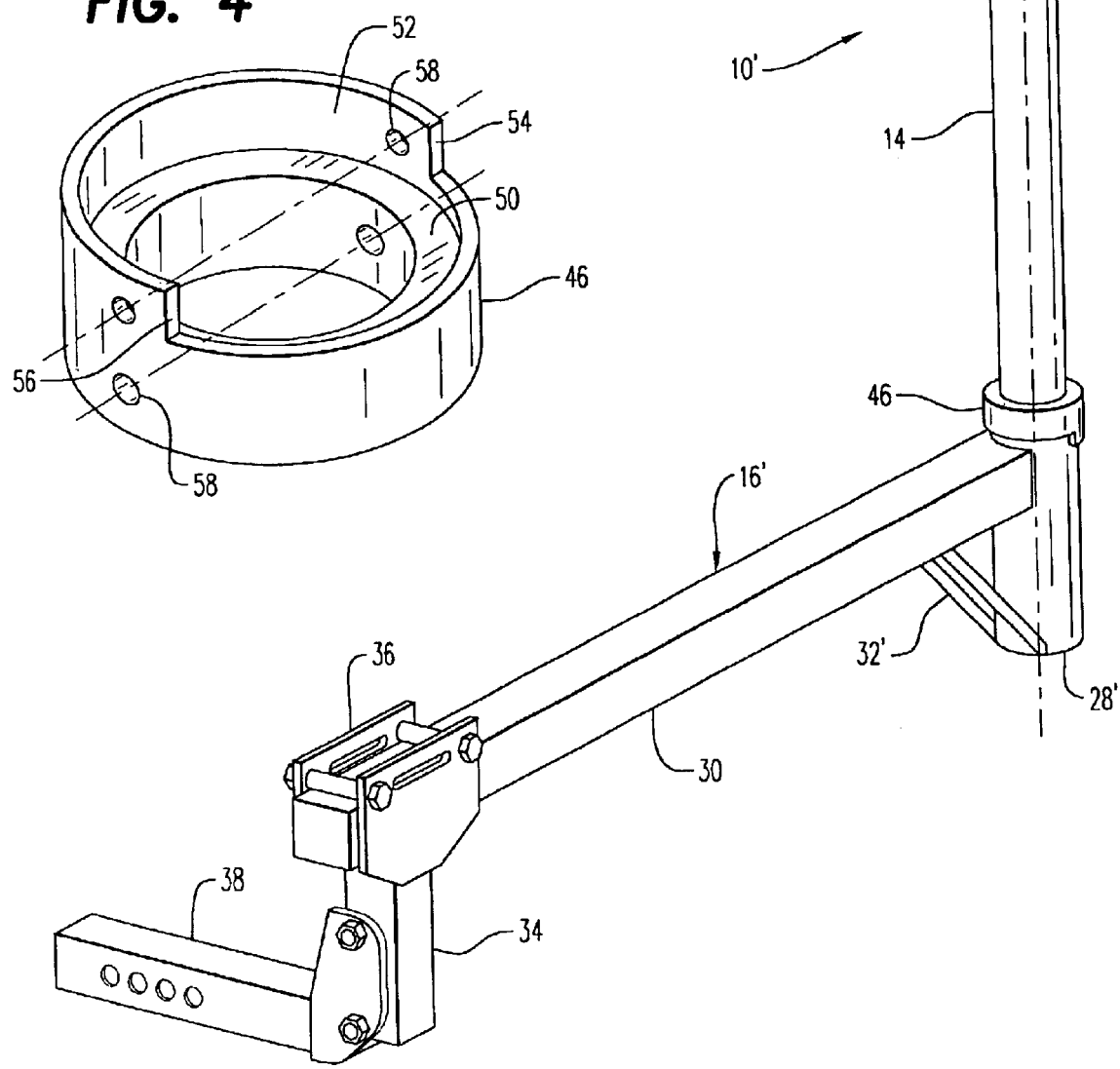

PERSONAL MOBILITY VEHICLE LIFT

CROSS-REFERENCE TO RELATED APPLICATIONS

None

STATEMENT REGARDING FEDERALLY SPONSORED RESEARCH OR DEVELOPMENT

None

INCORPORATION-BY-REFERENCE OF MATERIAL SUBMITTED ON A COMPACT DISC

None

BACKGROUND OF THE INVENTION

1. Field of the Invention

This invention relates generally to lift mechanisms for a personal mobility vehicle (PMV) and more particularly to a lift for a PMV which is attachable to a class II or Class III trailer hitch attached to the rear of a vehicle.

2. Description of Prior Art

The popularity of self-propelled personal mobility vehicles (PMV) for use by the physically challenged is gaining in popularity. These PMV's are typically of a three or four wheeled design and are used by those physically challenged who are either able to ambulate short distances or who travel with a personal attendant able to assist in the loading and offloading of a PMV from a car trunk or a rear door of a van thus facilitating access by the physically challenged person during PMV use and storage.

Several patented prior art systems and apparatus for the storage and conveyance of a PMV when not in use are disclosed in the following prior U.S. patents:

U.S. Pat. No. 6,007,289 to Kruse, et al.
U.S. Pat. No. 5,114,120 to Bartelt, et al.
U.S. Pat. No. 4,741,660 to Kent
U.S. Pat. No. 4,705,448 to Mungons
U.S. Pat. No. 5,011,361 to Peterson
U.S. Pat. No. 5,8616,763 to Hamann et al.
U.S. Pat. No. 5,431,522 to Ross
U.S. Pat. No. 4,127,200 to Mann
U.S. Pat. No. 4,671,729 to McFarland
U.S. Pat. No. 6,386,410 to Van Dusen et al.
U.S. Pat. No. 4,697,975 to Lippold
U.S. Pat. No. 4,738,581 to Kuhlman
U.S. Pat. No. 5,752,799 to Carey et al.
U.S. Pat. No. 5,853,282 to Bechler et al.
U.S. Pat. No. 5,810,547 to Bruno et al.
U.S. Pat. No. 5,205,700 to Lin et al.
U.S. Pat. No. 5,431,526 to Peterson et al.

Of particular interest in these prior art devices, the invention taught by Bartelt in U.S. Pat. No. 5,114,120 teaches an equipment mounting system which supportively engages with and depends upon support from a class II or class III trailer hitch attached to the back of the vehicle. These class II and class III trailer hitches typically provide a rectangular elongated cavity for receiving a closely similarly configured tongue of a trailer hitch. This equipment mounting system includes a pivotal leg which extends laterally beyond the right side of the vehicle for deployment and pick up of equipment stored at the rear of the vehicle on this system.

Another notable prior art U.S. Pat. No. 6,007,289 invented by Kruse teaches a wheelchair lift which is also attached to the rear trailer hitch structure attached to the rear of a vehicle. In this PMV lift, a lift support assembly is provided at the lower end of the upright stanchion so that a PMV may be loaded and offloaded onto a ground or sidewalk or road surface which is adjacent to and outboard from the side of the vehicle.

In depending upon the trailer hitch devices attached to the rear of such a conveyance vehicle, sufficient strength for lifting a PMV becomes an issue. The further from the center line of the vehicle and thus the trailer hitch mechanism that a PMV being lifted from or into the rear of the vehicle gets, the greater the torsional load being placed on the rectangular cavity and the trailer hitch itself. In the Bartelt disclosure, the equipment appears to be of relatively light weight nature, while the Kruse teaching depends for added strength upon this lift support assembly 26 to allow the apparatus to deploy and lift a PMV onto and from a surface which is substantially outboard or laterally disposed from the right side of the vehicle.

In the present invention, this load bearing limitation between the PMV lift and the trailer hitch itself is dealt with by strictly limiting the arch or rotational movement of the lifting boom about the upright axis of the stanchion so that no movement is permitted beyond a plane lying fore and aft to the vehicle and passing through the upright stanchion of the PMV lift itself.

BRIEF SUMMARY OF THE INVENTION

This invention is directed to a personal mobility vehicle (PMV) lift for loading and offloading a personal mobility vehicle (PMV) into and from a rear portion of a vehicle, the vehicle having an interior floor and a trailer hitch rigidly attached to the rear of the vehicle to which the PMV lift is rigidly engageable. The PMV lift receives substantially all of its support from the trailer hitch and includes an elongated laterally extending lifting boom and a drive mechanism connected adjacent a proximal end thereof. The drive mechanism includes an elongated flexible lifting cable or belt which is operably connectable for raising and lowering the PMV by operation of the drive mechanism. An upright stanchion is supportively connected to the lifting boom while an elongated lift support arm is supportively connected to a lower end of the stanchion. A trailer hitch engaging member is connectable at one end to the trailer hitch, the other end of which is connected to and supports a proximal end of the lift support arm. The PMV lift and PMV are substantially supported entirely by the trailer hitch.

It is therefore an object of this invention to provide a PMV lift for loading and offloading a PMV into and from the rear portion of a vehicle by utilizing as a sole support for the PMV lift and PMV a class II or class III trailer hitch having a rectangular receiving cavity longitudinally disposed there through.

Still another object of this invention is to provide a PMV lift which solely depends upon the interengaging structure with a class II or class III trailer hitch for its support and which limits the amount of stress placed on the trailer hitch by preventing actuate movement of the lifting boom from exceeding a predetermined distance from the center line of the vehicle and the trailer hitch itself.

In accordance with these and other objects which will become apparent hereinafter, the instant invention will now be described with reference to the accompanying drawings.

BRIEF DESCRIPTION OF THE SEVERAL VIEWS OF THE DRAWING(S)

FIG. 1 is a perspective view of the invention.

FIG. 3 is a perspective view of an alternate embodiment of the invention.

FIG. 4 is a perspective view of the rotation limit collar shown in the embodiments of FIGS. 1 and 3.

DETAILED DESCRIPTION OF THE INVENTION

Figure 2:
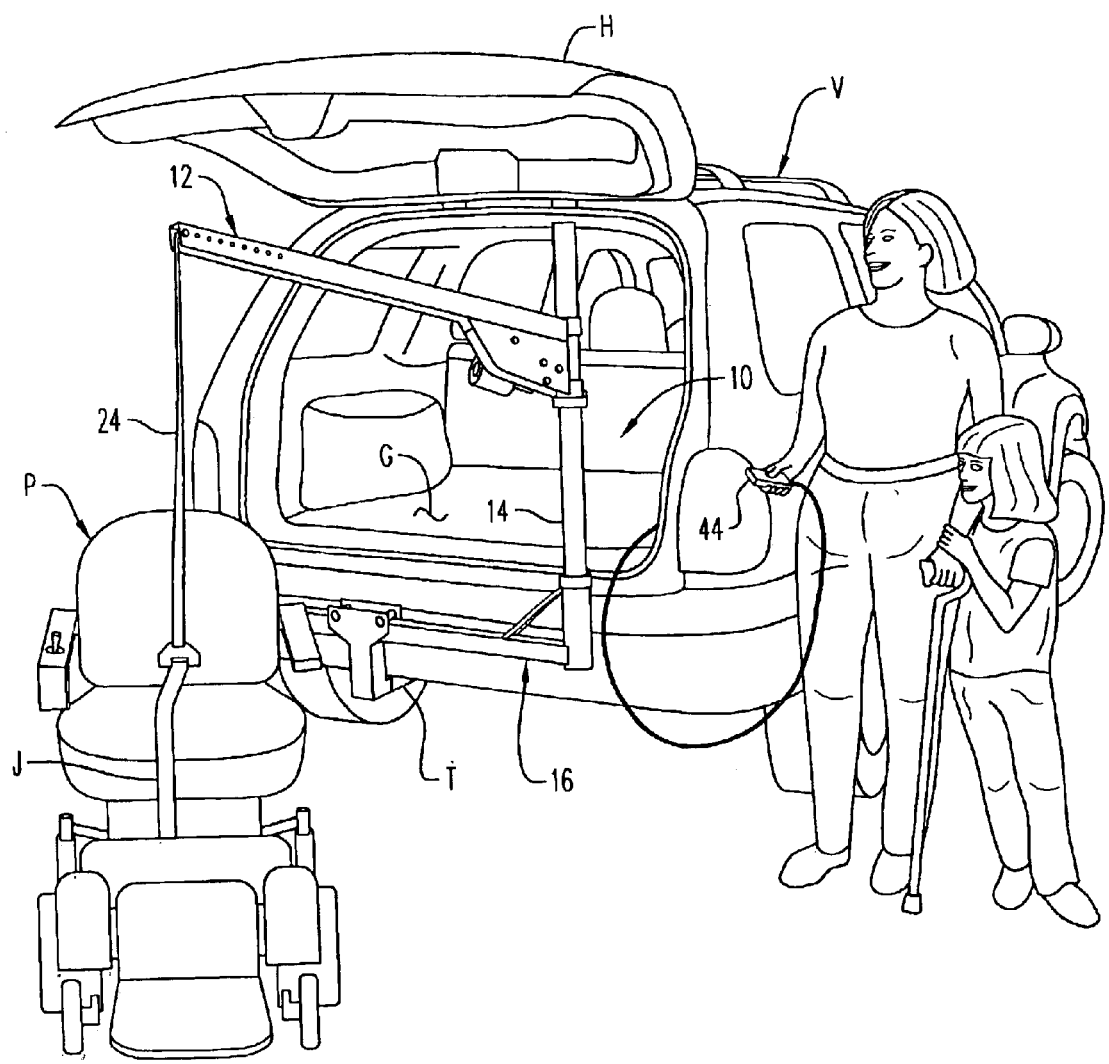
FIG. 2 is a perspective view of the invention attached to the rear of a vehicle an in use in deploying a personal mobility vehicle (PMV).

Referring now to the drawings, the preferred embodiment of the invention is there shown generally at numeral 10 in FIGS. 1 and 2. This personal mobility vehicle (PMV) lift 10 is structured for the loading and offloading of a personal mobility vehicle (PMV) shown generally at P in FIG. 2. The PMV P is to be offloaded from a floor surface G of a vehicle V with the rear door H or trunk deck lid (not shown) in the open position. The PMV P is thus deployable from the floor G to the ground as shown in FIG. 2 for use and then reloaded from the ground back onto the floor surface G for storage and conveyance.

The PMV lift 10 includes a lifting boom 12 having a power drive unit 20 attached adjacent the proximal end housing 22 thereof. The drive mechanism 20 includes a drive motor of a conventional battery powered nature engaged with a gear set (not shown) to rotate a drum or spool (also not shown) whereby a flexible cable or belt 24 is extended downwardly and lifted upwardly in the direction of arrow A about distal end roller 42 by appropriate operation of the drive mechanism 20.

A hook or attaching means 26 is provided at the distal end of the flexible cable or belt 24 which is attachable to a lifting harness J shown in FIG. 2 attached to the PMV P.

The proximal end housing 22 of the lifting boom 12 includes an elongated upright cylindrical cavity for receiving an upper end of an elongated cylindrical stanchion 14 which is fabricated of suitably sized steel tubing. By clamping means, the lifting boom 12 is positionable vertically in the direction of arrow B on the upright stanchion 14. Spaced apart NYLON or DELRIN upper and lower bushings (not shown) positioned between the proximal end housing 22 and the upper end of the stanchion 14 reduce rotational friction.

A stationary lift support arm 16 includes an elongated horizontally disposed beam 30 having an upright cylindrical stanchion support housing 28 disposed at one end thereof. Braces 32 reinforce the rigid orthogonal connection between the support beam 30 and the upright stanchion support housing 28. An upright offset member 34 is connected by clamping, slidable engagement to the other end of the elongated support beam 30 thus allowing adjustable lateral positioning of the support beam 30 in the direction of arrow C with respect to a trailer hitch engaging member 38.

The distal end 40 of the trailer hitch engaging member is insertable into a conventional class II or class III trailer hitch T as seen in FIG. 2. The cross sectional shape of the cavity provided by the trailer hitch T is closely mated and aligned with the outer rectangular surface of the elongated trailer hitch engaging member 38 whereby substantially no rotational movement about the longitudinal centerline CL of the vehicle V is permitted. This singular support aspect is of the utmost importance to the present invention as substantially all of the weight-bearing function is borne by the strength of the class II or class III trailer hitch in receiving and supporting the downward and torsional load of not only the weight of the entire PMV lift 10, but also that of the PMV P.

An alternate embodiment of the invention 10' in FIG. 3 is substantially identical to that described in FIGS. 1 and 2 except that the support beam 30 of the lift support arm 16' is rigidly connected to the upper end of the stanchion support member 28' with the strengthening bracing 32' extending downwardly at an acute angle therebetween for added strength.

Figure 5:
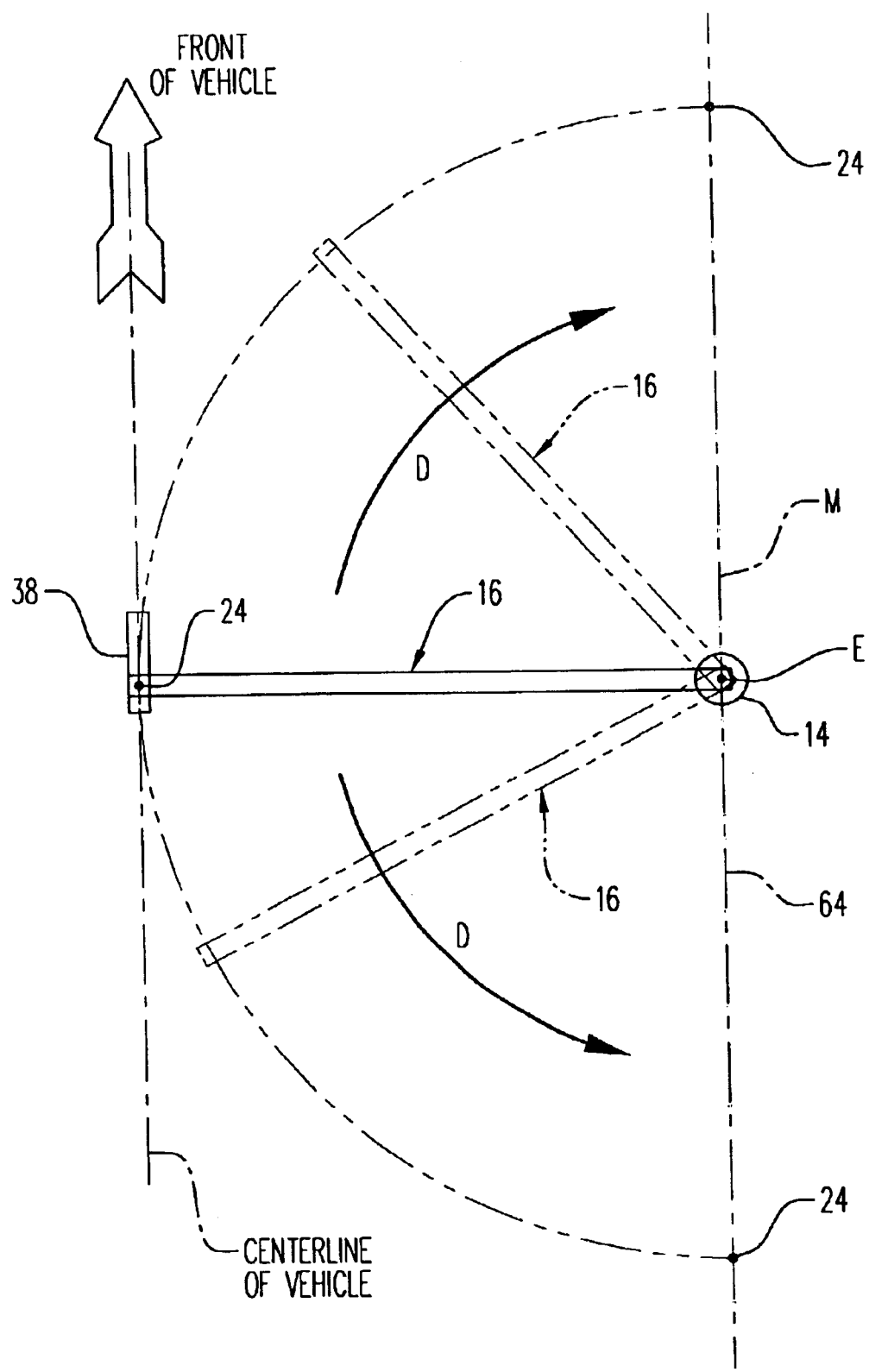
FIG. 5 is a top plan schematic view of the rotational limiting movement of the lifting boom of the invention.

Referring now particularly to FIGS. 1, 4 and 5, a most important aspect of the invention is there shown with respect to limiting the stress placed upon the interengaging attachment between the trailer hitch T and the trailer hitch engaging member 38. In initially deploying or storing the PMV P with respect to the floor G, the lifting boom 12 is inwardly disposed from the stanchion 14 and, because the PMV P is close to the centerline CL of the vehicle, very minimal torsional load is imposed on the interconnection between the trailer hitch engaging member 38 and the trailer hitch T. However, once the PMV P is positioned rearwardly of the vehicle V for either deployment or lifting of the PMV P, the distal end roller 42 and flexible cable or strap 24 are likely to be moved away from the centerline CL of the vehicle V. As described in prior art, this rotational movement of the lifting boom 12 which would position the PMV P beyond the side surface of the vehicle V and the upright stanchion 14 would dramatically increase the torsional or twisting load placed on the trailer hitch T.

To prevent such overstressing of the trailer hitch T and the interengaging contact with the trailer hitch engaging member 38, the rotational movement of the lifting boom 12 is thus strictly limited to movement in the direction of arrow D in FIGS. 1 and 5 about the upright axis E of stanchion 14. That is to say that the lifting boom 12 and the distal end portion of the flexible cable or strap 24 are prohibited from rotational movement beyond a fore-and-aft plane lying within line M which passes through the centerline E of the stanchion 14. In other words, the lifting boom 12 cannot swing beyond a position which is further from the centerline CL of the trailer hitch T and trailer hitch engaging member 38 than that of the stanchion 14.

To effect this rotational limitation of the lifting boom 12 on stanchion 14, a rotation limit collar 46 as best seen in FIG. 4 is provided. This collar 46 is lockably engageable onto the stanchion just above the stanchion support member 28 or 28' and just below the proximal portion 22 of the lifting boom 12. Attachment of each collar 46 is effected through threaded fasteners (not shown) in threaded openings 58 which bear against the outer surface of the stanchion 14 to secure the longitudinal spacing and rotational spacing of each collar 46.

Stop surfaces 54 and 56 bear against stop members (not shown) attached to or integral with the proximal housing 22 and stanchion support 28 so as to effect the desired rotational limitation of the lifting boom 12 about the vertical axis E of stanchion 14 as previously described.

By this arrangement, the structural integrity of the trailer hitch T is not compromised or overstressed so long as the personal mobility vehicle P is deployed and stored from a position which lies substantially between the longitudinal axis CL of the vehicle V and the upright axis E or E' of the stanchion 14.

While the instant invention has been shown and described herein in what are conceived to be the most practical and preferred embodiments, it is recognized that departures may be made therefrom within the scope of the invention, which is therefore not to be limited to the details disclosed herein, but is to be afforded the full scope of the claims so as to embrace any and all equivalent apparatus and articles.

What is claimed is:

1. A personal mobility vehicle (PMV) lift for loading and offloading a personal mobility vehicle (PMV) into and from a rear portion of a vehicle, the vehicle having an interior floor and a trailer hitch rigidly attached to the rear of the vehicle to which said PMV lift is rigidly engageable and from which said PMV lift receives substantially total support, said PMV lift comprising:

an elongated laterally extending lifting boom and a drive mechanism connected adjacent a proximal end thereof, said drive mechanism including an elongated flexible lifting cable or belt extending downwardly from a distal end of said lifting boom, said drive mechanism operably connected to a proximal portion of said lifting cable or belt whereby a PMV attachable to a distal end of said lifting cable or belt and may be raised or lowered by operation of said drive mechanism;

an elongated upright stanchion supportively connected at an upper end thereof to the proximal end of said lifting boom;

an elongated lift support arm supportively connected at a distal end thereof to a lower end of said stanchion;

a trailer hitch engaging member connectable at a first end thereof to the trailer hitch, a second end of said trailer hitch engaging member connected to a proximal end of said lift support arm whereby said PMV lift is substantially fully supported by the trailer hitch;

a rotation stop mounted on said stanchion for limiting rotation of said lifting boom with respect to an upright axis of said stanchion between a first position within the rear of the vehicle whereby the PMV may be lowered or lifted with respect to the floor of the vehicle and a second position behind the vehicle whereby the PMV may be lowered to or lifted from the ground.

2. A personal mobility vehicle (PMV) lift as set forth in claim 1, wherein: said lifting boom is vertically adjustable on said stanchion.

3. A personal mobility vehicle (PMV) lift as set forth in claim 1, wherein: said lift support arm is laterally adjustable with respect to said trailer hitch engaging member.

4. A personal mobility vehicle (PMV) lift as set forth in claim 1, wherein the trailer hitch includes a class II or III receiver having a straight rectangular receiving cavity and wherein:

said trailer hitch engaging member has an outside rectangular cross section configuration substantially closely mating within the receiving cavity of the trailer hitch preventing substantial axial rotation of said trailer hitch engaging member while positioned within the trailer hitch thus fully supporting said lift support arm from substantial rotation about a longitudinal axis of the trailer hitch.

5. A personal mobility vehicle (PMV) lift for loading and offloading a personal mobility vehicle (PMV) into and from a rear portion of a vehicle, the vehicle having an interior floor and a trailer hitch rigidly attached to the rear of the vehicle to which said PMV lift is rigidly engageable and from which said PMV lift receives substantially total support, said PMV lift comprising:

an elongated laterally extending lifting boom and a drive mechanism connected adjacent a proximal end thereof, said drive mechanism including an elongated flexible lifting cable or belt extending downwardly from a distal end of said lifting boom, said drive mechanism operably connected to a proximal portion of said lifting cable or belt whereby a PMV attachable to a distal end of said lifting cable or belt and may be raised or lowered by operation of said drive mechanism:

an elongated upright stanchion supportively connected at an upper end thereof to the proximal end of said lifting boom;

an elongated lift support arm supportively connected at a distal end thereof to a lower end of said stanchion;

a trailer hitch engaging member connectable at a first end thereof to the trailer hitch, a second end of said trailer hitch engaging member connected to a proximal end of said lift support arm whereby said PMV lift is substantially fully supported by the trailer hitch;

a rotation stop mounted on said stanchion which limits rotation of said lifting boom about an upright axis of said stanchion whereby the distal end of said lifting boom is prevented from movement further from said trailer hitch engaging member than that of said stanchion.

6. A personal mobility vehicle (PMV) lift as set forth in claim 5, wherein: said lifting boom is vertically adjustable on said stanchion.

7. A personal mobility vehicle (PMV) lift as set forth in claim 5, wherein: said lift support arm is laterally adjustable with respect to said trailer hitch engaging member.

8. A personal mobility vehicle (PMV) lift as set forth in claim 5, wherein the trailer hitch includes a class II or III receiver having a straight rectangular receiving cavity and wherein:

said trailer hitch engaging member has an outside rectangular cross section configuration substantially closely mating within the receiving cavity of the trailer hitch preventing substantial axial rotation of said trailer hitch engaging member while positioned within the trailer hitch thus fully supporting said lift support arm from substantial rotation about a longitudinal axis of the trailer hitch.

9. A personal mobility vehicle (PMV) lift for loading and offloading a personal mobility vehicle (PMV) into and from a rear portion of a vehicle, the vehicle having a trailer hitch rigidly attached to the rear of the vehicle to which said PMV lift is rigidly engageable and from which said PMV lift receives substantially total support, said PMV lift comprising:

a lifting boom having an elongated laterally extending arm and a drive mechanism connected adjacent a proximal end thereof, said drive mechanism including an elongated flexible lifting cable or belt extending therefrom and downwardly from a distal end of said lifting boom, said drive mechanism powering said lifting cable in and out with respect to said lifting boom;

an elongated upright stanchion supportively connected at an upper end thereof to the proximal end of said lifting boom;

an elongated lift support arm supportively connected at a distal end thereof to a lower end of said stanchion;

a trailer hitch engaging member connectable at a first end thereof to the trailer hitch, a second end of said trailer hitch engaging member connected to a proximal end of said lift support arm whereby said PMV lift is substantially fully supported by the trailer hitch;

a rotation which limits rotation of said lifting boom about an upright axis of said stanchion substantially further from the trailer hitch than a plane passing through the upright axis of said stanchion and oriented lengthwise to the vehicle.

10. A personal mobility vehicle (PMV) lift as set forth in claim 9, wherein:

said lifting boom is vertically adjustable on said stanchion.

11. A personal mobility vehicle (PMV) lift as set forth in claim 9, wherein:

said lift support arm is laterally adjustable with respect to said trailer hitch engaging member.

12. A personal mobility vehicle (PMV) lift as set forth in claim 9, wherein the trailer hitch includes a class II or III receiver having a straight rectangular receiving cavity and wherein:

said trailer hitch engaging member has an outside rectangular cross section configuration substantially closely mating within the receiving cavity of the trailer hitch preventing substantial axial rotation of said trailer hitch engaging member while positioned within the trailer hitch thus fully supporting said lift support arm from substantial rotation about a longitudinal axis of the trailer hitch.

* * * * *